United States Patent
Harada

(10) Patent No.: US 8,896,878 B2
(45) Date of Patent: Nov. 25, 2014

(54) PRINTING INSTRUCTION PROGRAM, IMAGE FORMING APPARATUS AND METHOD FOR DISPLAYING PREVIEW

(75) Inventor: Seiji Harada, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 337 days.

(21) Appl. No.: 13/302,533

(22) Filed: Nov. 22, 2011

(65) Prior Publication Data

US 2012/0133980 A1 May 31, 2012

(30) Foreign Application Priority Data

Nov. 29, 2010 (JP) ................................ 2010-265710

(51) Int. Cl.
  G06F 15/00 (2006.01)
  G06K 1/00 (2006.01)
  G06F 3/12 (2006.01)

(52) U.S. Cl.
  CPC ............ *G06F 3/1285* (2013.01); *G06F 3/1204* (2013.01); *G06F 3/1208* (2013.01); *G06F 3/1205* (2013.01); *G06F 3/1256* (2013.01)
  USPC .......................................... 358/1.2; 358/1.15

(58) Field of Classification Search
  None
  See application file for complete search history.

(56) References Cited

U.S. PATENT DOCUMENTS

2007/0268280 A1* 11/2007 Fujita et al. .................. 345/204

FOREIGN PATENT DOCUMENTS

JP  2007-193701 A   8/2007
JP  2007265320   * 10/2007

OTHER PUBLICATIONS

Adobe Acrobat 9 Pro Print Preview.*
Acrobat 9 Pro Version Date.*

* cited by examiner

*Primary Examiner* — Fan Zhang
(74) *Attorney, Agent, or Firm* — Buchanan Ingersoll & Rooney

(57) ABSTRACT

Disclose is an image forming apparatus, which makes it possible to easily change the display magnification factor of the print preview image, by conducting intuitive operations. A print function setting section of the apparatus includes: a first designating section to accept a designation of a display magnification factor to be employed for displaying the print preview; a second designating section to accept a designation of a display mode; a magnification factor determining section to calculate display magnification factors; an image creating section to create the print preview, based on the display magnification factor designated by the first designating section, or another display magnification factor calculated by the magnification factor determining section; and a display controlling section to implement controlling operations for displaying the print preview, the slider and the buttons onto the display screen, indicating the current magnification factor and displaying a button corresponding to the fit page display mode.

13 Claims, 5 Drawing Sheets

PRINTING INSTRUCTION PROGRAM, IMAGE FORMING APPARATUS AND METHOD FOR DISPLAYING PREVIEW

This application is based on Japanese Patent Application NO. 2010-265710 filed on Nov. 29, 2010, with the Japan Patent Office, the entire content of which is hereby incorporated by reference.

BACKGROUND OF THE INVENTION

The present invention relates to a printing instruction program, an image forming apparatus and a method for displaying a preview, and specifically relates to a printing instruction program, an image forming apparatus and a method for displaying a preview, in each of which an operation for displaying a preview of an image to be printed on a printing medium is controlled.

In recent years, various kinds of printing apparatuses, such as printers, MFP (Multi-Functional Peripherals), etc., (hereinafter, referred to as an image forming apparatus as a general term for each of them) have been increasingly proliferated in the market concerned. When the image forming apparatus is employed as a network printer, a document is created by executing an application program installed in a computer terminal device coupled to the concerned network at first, and then, the data representing the above-created document is converted to print data in conformity with the Page Description Language by employing software (printer driver) for controlling the image forming apparatus, so as to transmit the print data to the image forming apparatus. Receiving the print data sent from the computer terminal device, the image forming apparatus parses the print data so as to create an intermediate data, and then, converts the intermediate data to image data in conformity with the bitmap format in order to output the image onto a paper sheet medium based on the bitmap image data.

In such a case that the printing instruction is issued from the computer terminal device as abovementioned, the print product is wasted in vain unless the print product outputted by the image forming apparatus is in conformity with the user's desired form, and in this case, the user should operate the computer terminal device again to issue a revised printing instruction to the image forming apparatus concerned. Accordingly, in order to prevent the image forming apparatus from generating such the wasted print products and to improve the convenience aspect and usability of the user, a conventional system is so constituted that the printer driver displays a print preview on the computer terminal device before the printing instruction is transmitted to the image forming apparatus, so as to make it possible for the user to confirm in advance the output status of the final image to be outputted onto the print product concerned.

With respect to the operation for displaying the preview abovementioned, for instance, with respect to an image processing apparatus that creates a print preview of a document including an image and characters, Tokkai 2007-193701 (Japanese Patent Application Laid-Open Publication) sets forth such a configuration that comprises: a character logical information acquiring section to acquire character logical information, which has been established in advance and is to be employed at the time of printing operation; a first preview image creating section to vary the magnification factor of the original image size of the image included in the abovementioned document, corresponding to the size of the depicting area for the print preview, so as to generate the preview of the image concerned; a second preview image creating section to create character bitmap data having a resolution equal to or greater than the printing resolution, from the characters included in the document, by employing the character logical information to be employed at the time of printing operation, and then, to vary the magnification factor of the original character size of the characters included in the abovementioned document, corresponding to the size of the depicting area for the print preview, so as to generate the preview of the characters concerned; and a display section to create a print preview screen by combining the image print preview created by the first preview image creating section with the character print preview created by the second preview image creating section, so as to display the print preview image thereon.

As abovementioned, by displaying the print preview before instructing the printing operation concerned, it becomes possible for the user to confirm the output status of the print product on the screen of the computer terminal device. In addition to the above, if it were possible for the user to confirm the page layout while changing the display magnification factor thereof, and/or to confirm a state of a specific small area in detail (for instance, an partial area where characters and an image overlap with each other), it would be very convenient for the user concerned.

According to the conventional printer driver, however, since the display magnification factor can be varied by operating menu buttons, a keyboard and/or a mouse, there has been such a problem that the operating procedure for changing the display magnification factor has been very complicated and cumbersome, and accordingly, it has been impossible for the user to easily change the display magnification factor.

Further, since the conventional printer driver can display a current display magnification factor only, once the display magnification factor has been changed, it becomes difficult to resume the original display magnification factor. Specifically, in regard to the print preview, since it is convenient for the user to view the print preview, which is displayed in such a manner that one page of the document is displayed within a display area by employing such a magnification factor that makes one page of the document fit to all over the display area (fit page display mode, so to speak), the print preview is displayed in the fit page display mode at the initial state. However, since the magnification factor to be employed for the fit page display mode is tend to became a certain broken-numeral, it would be difficult to resume the fit page display mode after the display magnification factor has been once changed, and there has arisen such another problem that the usability of the image forming apparatus concerned has been deteriorated.

SUMMARY OF THE INVENTION

To overcome the abovementioned drawbacks in conventional systems concerned, it is one of objects of the present invention to provide a non-transient computer readable storage medium, an image forming apparatus and a print preview displaying method, each of which makes it possible for the user not only to easily change the display magnification factor of the print preview image, by conducting intuitive operations, but also to easily resumes the specific magnification factor to be employed for fitting one page of a document into the display area thereof.

Accordingly, at least one of the objects of the present invention can be attained by any one of the non-transient computer readable storage mediums, the image forming apparatus and the print preview displaying method, described as follows.

(1) According to a non-transient computer readable storage medium reflecting an aspect of the present invention, the non-transient computer readable storage medium stores a computer executable program, which is to be installed into either a computer device that instructs a printing operation or an image forming apparatus that implements the printing operation, so as to conduct an operation for displaying a print preview image of a document, serving as a printing object, onto a display screen, the program being executable by a computer to cause the computer to perform a process comprising: accepting a designation of a display magnification factor, which is inputted by sliding a pointer movable on a slider indicating a plurality of display magnification factors allotted thereon, and which is to be employed for displaying the print preview image; accepting a designation of a display mode, which is inputted by depressing one of buttons, and in which the print preview image is to be displayed; calculating display magnification factors respectively corresponding to display modes correlated with the buttons; creating the print preview image, based on either the display magnification factor designated in the accepting step, or another display magnification factor, which is calculated in the calculating step in regard to the one of buttons; and implementing controlling operations for displaying the print preview image, the slider and the buttons onto the display screen, indicating a current magnification factor on the slider in a visible manner, and displaying a button corresponding to a specific display mode in which an overall contents included in one page of a document is displayed onto the display screen, while correlating the button with a display magnification factor corresponding to the specific display mode.

(2) According to another aspect of the present invention, in the non-transient computer readable storage medium recited in item 1, the process further comprises: displaying display magnification factors, respectively corresponding to various kinds of display modes, onto the slider, while correlating the display magnification factors with the buttons, respectively corresponding to the display modes; wherein the display modes include at least one of a display mode in which the print preview image is displayed by employing a minimum magnification factor being settable by the slider; another display mode in which the print preview image is displayed by employing a maximum magnification factor being settable by the slider; still another display mode in which the print preview image is displayed by employing such a magnification factor that makes a size of the print preview image coincide with that of the document to be printed; still another display mode in which the print preview image is displayed by employing such a magnification factor that makes a height of the print preview image coincide with that of the display screen; and yet another display mode in which the print preview image is displayed by employing such a magnification factor that makes a width of the print preview image coincide with that of the display screen.

(3) According to still another aspect of the present invention, in the non-transient computer readable storage medium recited in item 1 or item 2, the process further comprises: displaying display magnification factors, respectively corresponding to various kinds of display modes, onto the slider, while correlating the display magnification factors with the buttons, respectively corresponding to the display modes; wherein the slider and the buttons are displayed onto the display screen, in such a manner that either lines or arrow symbols are employed for connecting the buttons, respectively corresponding to the display modes, to positions of the display magnification factors displayed on the slider and respectively corresponding to the display modes, so as to correlate the buttons with the display magnification factors.

(4) According to an image forming apparatus reflecting still another aspect of the present invention, the image forming apparatus, comprises: a print function setting section to display a print preview image of a document, serving as a printing object, onto a display screen; and a print processing section to print an image in conformity with the print preview image onto a paper sheet; wherein the print function setting section is provided with: a first designating section to accept a designation of a display magnification factor, which is inputted by sliding a pointer movable on a slider indicating a plurality of display magnification factors allotted thereon, and which is to be employed for displaying the print preview image; a second designating section to accept a designation of a display mode, which is inputted by depressing one of buttons, and in which the print preview image is to be displayed; a magnification factor determining section to calculate display magnification factors respectively corresponding to display modes correlated with the buttons; an image creating section to create the print preview image, based on either the display magnification factor designated by the first designating section, or another display magnification factor, which is calculated by the magnification factor determining section in regard to the one of buttons, designated by the second designating section; a display controlling section to implement controlling operations for displaying the print preview image, the slider and the buttons onto the display screen, indicating a current magnification factor on the slider in a visible manner, and displaying a button corresponding to a specific display mode in which an overall contents included in one page of a document is displayed onto the display screen, while correlating the button with a display magnification factor corresponding to the specific display mode.

(5) According to still another aspect of the present invention, in the image forming apparatus recited in item 4, the display modes include at least one of a display mode in which the print preview image is displayed by employing a minimum magnification factor being settable by the slider; another display mode in which the print preview image is displayed by employing a maximum magnification factor being settable by the slider; still another display mode in which the print preview image is displayed by employing such a magnification factor that makes a size of the print preview image coincide with that of the document to be printed; still another display mode in which the print preview image is displayed by employing such a magnification factor that makes a height of the print preview image coincide with that of the display screen; and yet another display mode in which the print preview image is displayed by employing such a magnification factor that makes a width of the print preview image coincide with that of the display screen; and the display controlling section implements the controlling operations for displaying the slider and the buttons onto the display screen, in such a manner that the buttons respectively corresponding to the display modes are correlated with the magnification factors displayed on the slider and respectively corresponding to the display modes.

(6) According to still another aspect of the present invention, in the image forming apparatus recited in item 4 or item 5, the display controlling section implements the controlling operations for displaying the slider and the buttons onto the display screen, in such a manner that either lines or arrow symbols are employed for connecting the buttons, respectively corresponding to the display modes, to positions of the display magnification factors displayed on the slider and respectively corresponding to the display modes, so as to correlate the buttons with the display magnification factors.

(7) According to a print preview displaying method reflecting yet another aspect of the present invention, the print preview displaying method, which is to be employed in either a computer device that instructs a printing operation or an image forming apparatus that implements the printing operation, for displaying a print preview image of a document, serving as a printing object, onto a display screen, the print preview displaying method comprises: displaying the print preview image, a slider that accepts a designation of a display magnification factor for the print preview image, and buttons that accept a designation of a display mode for the print preview image, onto the display screen; indicating a current magnification factor on the slider in a visible manner; and correlating one of the buttons, which corresponds to a specific display mode in which an overall contents included in one page of a document is displayed onto the display screen, with one of display magnification factors displayed on the slider, which corresponds to the specific display mode.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
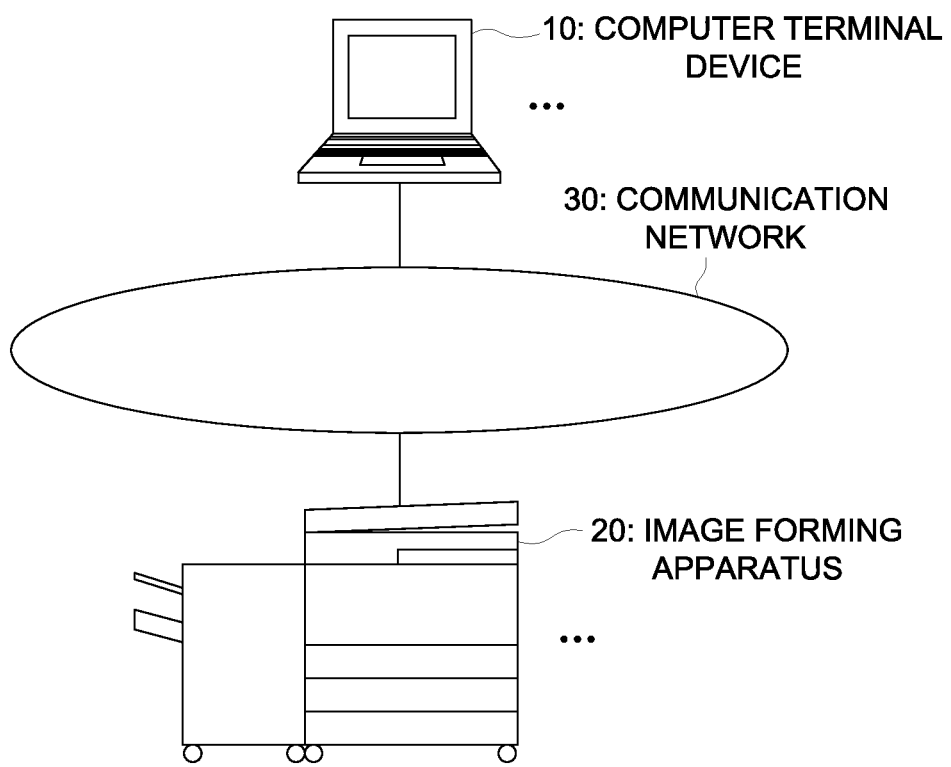
FIG. 1 shows a schematic diagram indicating a configuration of a printing system, embodied in the present invention.

As described in the "BACKGROUND OF THE INVENTION", since a print preview can be displayed on an image forming apparatus or a personal computer by executing a printer driver, and it is important to make it easy for the user to confirm a layout of a whole page from the print preview, an operating button labeled with "WHOLE PAGE" or the like has been provided in the menu command screen to be display on the conventional image forming apparatus or the personal computer. However, according to the conventional printer driver, since the display magnification factor can be changed by operating the menu buttons, the keyboard and the mouse, the changing operations have been complicated and very cumbersome for the user. In addition to above, since the conventional printer driver can display a current display magnification factor only, there has been such a problem that, once the display magnification factor has been changed, it becomes difficult to resume the original display magnification factor.

For instance, according to a map display application program, serving as an example of various kinds of technologies relating to the operation for changing the display magnification factor, a slider controller for varying the display magnification factor (reduction scale) is displayed on the concerned screen by executing the map display application program, so as to make it possible for the user to change the reduction scale by operating a sliding pointer of the slider controller, and accordingly, this makes the user's intuitive operation possible. Further, according to the map display application program, the selection buttons for selecting any one of a block number, a town, a prefecture, a country, etc., according to the user's purpose, are also provided, so as to make it possible for the user to select a reduction scale in conformity with his purpose.

In this connection, in the case of the map of Japan, since the sizes of the block numbers, the towns, the prefectures, the country, etc., are roughly determined, it is possible to respectively correlate them to predetermined reduction scales. However, in the case of the print products, since the sizes of various kinds of print products widely vary from the postcard size to the A3 size, and the displaying area on the display screen is not constant, it has been impossible to correlate the display magnification factor with the size of the print product according to the user's purpose, such as the "WHOLE PAGE", etc.

For instance, the magnification factor to be employed for displaying the whole page widely varies depending on a size of the concerned page and another size of the displaying area, it is impossible to appropriately display the whole page, even by correlating the display magnification factor with the user's purpose, such as the "WHOLE PAGE", etc. Further, even if the magnification factor can be adjusted so as to display the whole page, once the magnification factor is further changed to another value, it becomes impossible to resume the magnification factor for displaying the whole page, but it is necessary to readjust the magnification factor so as to resume the original value.

Accordingly, even if the slider controlling function provided in the map display application program were introduced into the print preview application program, it would be impossible to display the print preview of the original document by employing the display magnification factor appropriate for the printing.

To overcome the abovementioned drawback, one of the objects of the present invention is to provide an embodiment that makes it possible for the user to change the magnification factor of the print preview according to his purpose, based on the user's intuitive operations. Concretely speaking, a print control program, such as a printer driver, etc., or an image forming apparatus, embodied in the present invention, is provided with a print function setting section for making the display section display a preview screen, which is provided with an area for displaying a preview image of the document serving as the print object. Further, the print function setting section is constituted by: a magnification factor designating section to accept a designation of the display magnification factor of the preview image, made by sliding a pointer displayed on a slider; a purpose command section to accept a designation of the displaying mode of the preview image, made by selecting any one of buttons; a magnification factor determining section to calculate a magnification factor corresponding to the button concerned; an image creating section to create the preview of the document, based on the display magnification factor designated in the magnification factor designating section, or, the other display magnification factor calculated by the magnification factor determining section, corresponding to the button designated in the purpose command section; and a display controlling section to control and implement the operations for displaying the preview image, the slider and the buttons on the preview screen, indicating the current magnification factor clearly on the slider, and displaying the button correlated to the "FIT PAGE" mode, while correlating it with the magnification factor corresponding to the "FIT PAGE" mode on the slider.

EMBODIMENT

Figure 2A:
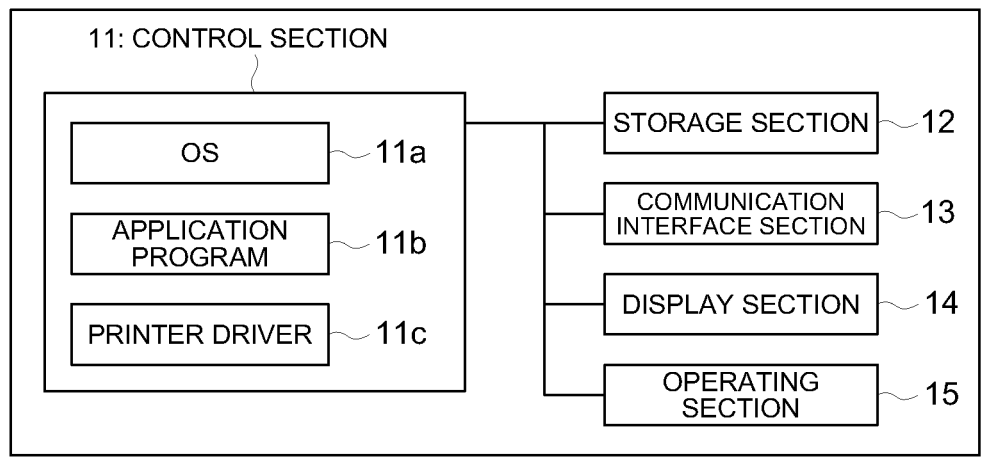
FIG. 2a and FIG. 2b show block diagrams indicating configurations of a computer terminal device and a printer driver, embodied in the present invention, respectively.
Figure 2B:
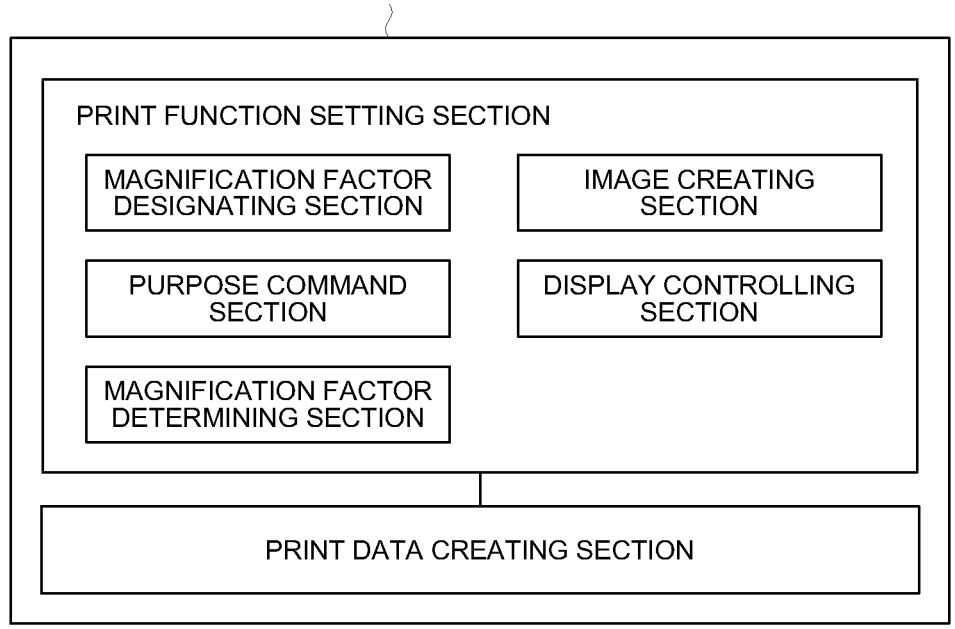
Figure 3:
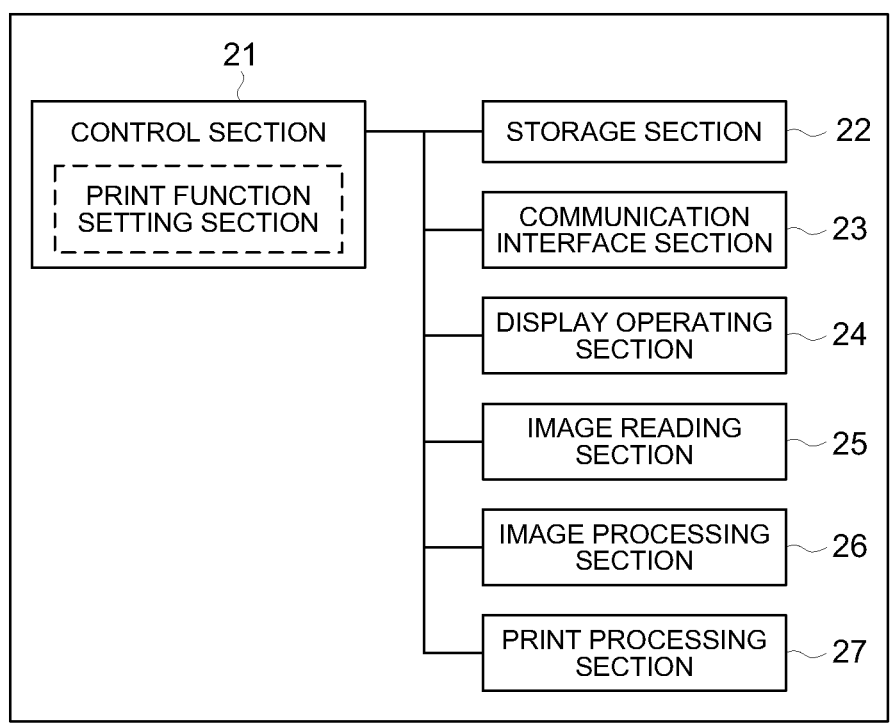
FIG. 3 shows a block diagram indicating a configuration of an image forming apparatus, embodied in the present invention.
Figure 4:
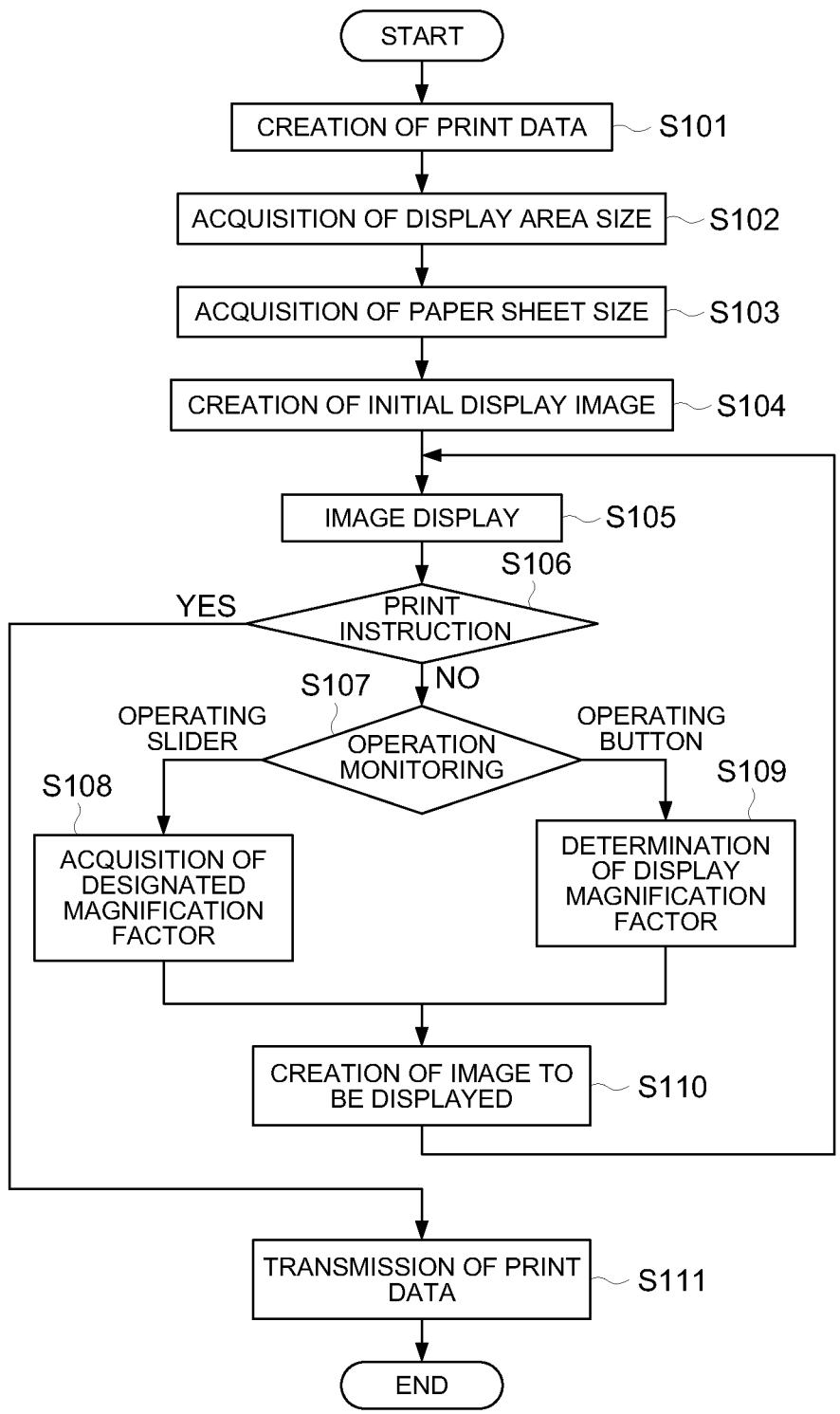
FIG. 4 shows a flowchart indicating a flow of operations to be conducted by the computer terminal device, embodied in the present invention.
Figure 5:
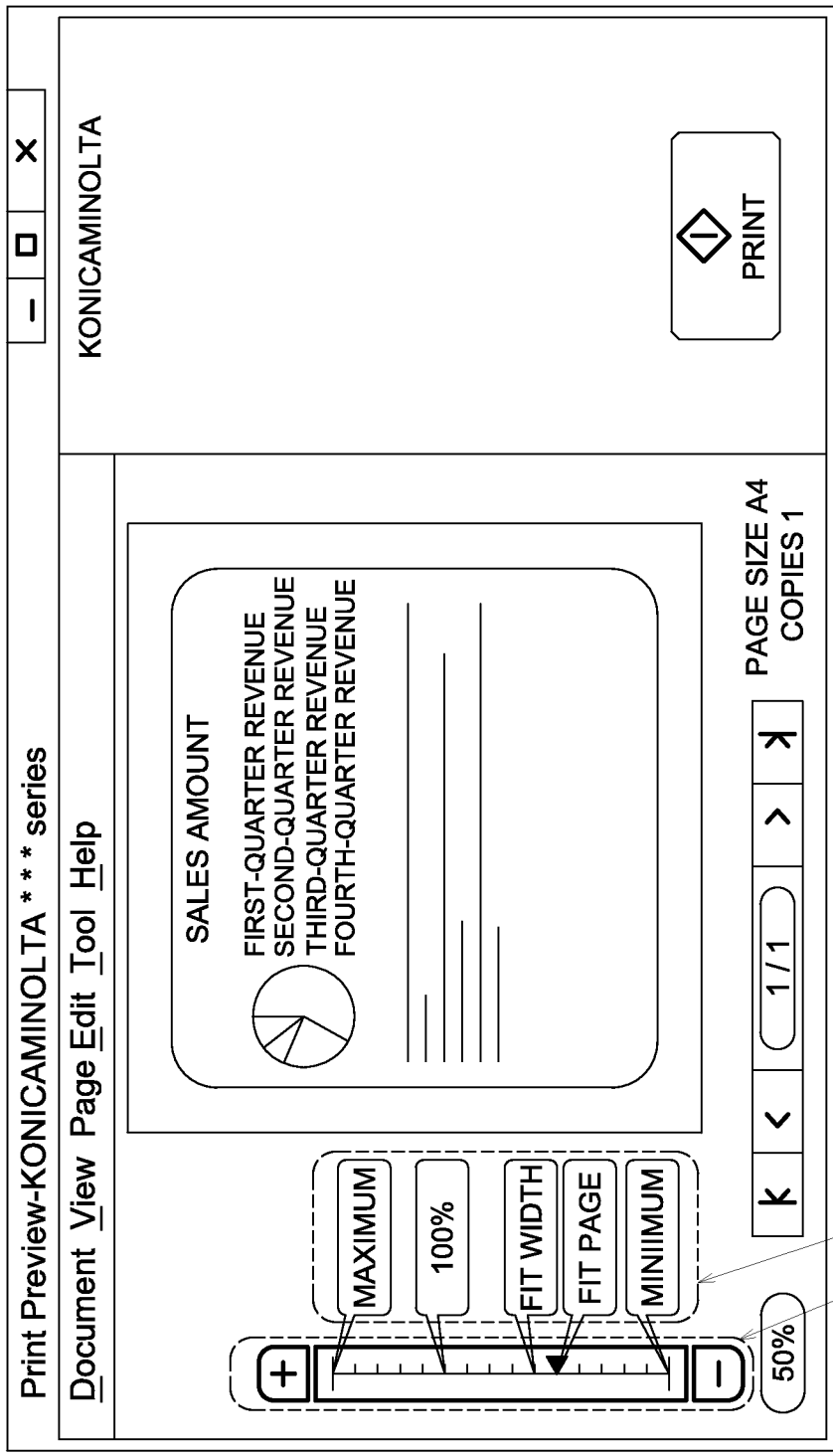
FIG. 5 shows a schematic diagram indicating an example of a print preview screen to be display on a computer terminal device, embodied in the present invention.

In order to describe the preferred embodiment of the present invention in detail, referring to FIG. 1 through FIG. 5, a printing instruction program, an image forming apparatus and a method for displaying a preview, embodied in the present invention, will be detailed in the following. FIG. 1 shows a schematic diagram indicating a configuration of the printing system, embodied in the present invention. FIG. 2a and FIG. 2b show block diagrams indicating configurations of a computer terminal device and a printer driver, embodied in the present invention, respectively, while FIG. 3 shows a block diagram indicating a configuration of an image forming apparatus, embodied in the present invention. Further, FIG. 4 shows a flowchart indicating a flow of operations to be conducted by the computer terminal device, embodied in the present invention, and FIG. 5 shows a schematic diagram indicating an example of a print preview screen to be display on the computer terminal device, embodied in the present invention.

As shown in FIG. 1, the printing system, embodied in the present invention, is constituted by a computer terminal device 10 to transmit print data so as to instruct a printing operation and an image forming apparatus 20 that receives the print data to implement the printing operation instructed. The computer terminal device 10 and the image forming apparatus 20 are coupled to each other through a communication network 30, such as a LAN (Local Area Network), a WAN (Wide Area Network), etc., which is specified by the standard of the Ethernet (Registered Trade Mark), the Token Link, the FDDI (Fiber Distributed Data Interface), etc. Each of the apparatuses concerned will be detailed in the following.
<Computer Terminal Device>

As shown in FIG. 2a, the computer terminal device 10 is constituted by a control section 11, a storage section 12, a communication interface section 13, a display section 14, an operating section 15, etc.

The control section 11 is constituted by a CPU (Central Processing Unit) and storage devices including a ROM (Read Only Memory), a RAM (Random Access Memory), etc. The CPU reads out programs for controlling the operations of the computer terminal device 10, an OS (Operating System) 11a, an application program 11b, a device driver for controlling the image forming apparatus 20 (printer driver 11c), etc., from the ROM or the storage section 12, and develops them on the RAM so as to execute the developed programs.

Further, as shown in FIG. 11c, the printer driver 11c abovementioned serves as not only the print function setting section that makes it possible to establish the settings for utilizing the functions provided in the image forming apparatus 20, but also a print data creating section that converts the data representing the original document, which has been created by executing the application program 11b, to the print data written in the language being readable (translatable) by the image forming apparatus 20 (PDL (Page Description Language), such as the PCL (Printer Control language), PS (Post Script), etc.) so as to create the print data and to instruct the printing operation.

Still further, the print function setting section abovementioned is provided with a function for making the display section 14 display a preview screen, detailed later, thereon, and is constituted by: a magnification factor designating section that accepts the magnification factor designated by sliding the pointer displayed on the slider controller; a purpose command section that accepts a purpose (displaying mode) designated by selecting any one of buttons corresponding to the user's purposes (various kinds of displaying modes), such as minimum value, maximum value, 100%, whole page, adjusting width, adjusting height, so on; a magnification factor determining section that determines the display magnification factor from the image size and the size of the display area, corresponding to the purpose (displaying mode) selected in the purpose command section; an image creating section that creates the image with a resolution, which is determined, based on the display magnification factor directly designated in the magnification factor designating section, or, the other display magnification factor determined by the magnification factor determining section; a display controlling section that makes the display section 14 display the preview image, the slider controller and the buttons on the preview screen, and that clearly indicates the current magnification factor onto the slider controller, and also displays the button corresponding to the purpose (displaying mode) (at least the button corresponding to the "FIT PAGE" mode), while correlating it with the magnification factor corresponding to the abovementioned purpose (displaying mode) displayed on the slider controller; etc.

The storage section 12 is constituted by a HDD (Hard Disc Drive), etc., so as to store various kinds of programs and print data therein. Specifically, according to the present embodiment, a list of setting items in a unit of page, a stapling position information correlating to a staple setting item, a figure correlating to a stapling status, etc. are stored into the storage section 12.

The communication interface section 13 is constituted by a MC (Network Interface Card), a modem, etc., in order to transmit the print data to the image forming apparatus 20 through the communication network 30.

The display section 14 is constituted by an LCD (Liquid Crystal Display), an Organic EL (Electroluminescence) display device, etc., so as to display a print setting screen for establishing print conditions, a detail setting screen for setting the stapling operation in a unit of page, etc.

The operating section 15 is constituted by a mouse, a keyboard, etc., so as to make it possible to conduct various kinds of operations, such as creating a document by employing the application program 11b, establishing the printing conditions by executing the printer driver 11c, establishing staple settings in a unit of page, instructing a printing operation, etc.
<Image Forming Apparatus>

As shown in FIG. 3, the image forming apparatus 20 is constituted by a control section 21, a storage section 22, a communication interface section 23, a display operating section 24, an image reading section 25, an image processing section 26, a print processing section 27, etc.

The control section 21 is constituted by a CPU (Central Processing Unit) and storage devices including a ROM (Read Only Memory), a RAM (Random Access Memory), etc. The CPU reads out various kinds of programs from the ROM or the storage section 22, and develops them on the RAM to execute the developed programs so as to control the overall operations to be performed in the image forming apparatus 20.

The storage section 22 is constituted by a HDD (Hard Disc Drive), etc., so as to store various kinds of programs and print data, image data processed by the image processing section 26, etc., therein.

The communication interface section 23 is constituted by a MC (Network Interface Card), a modem, etc., in order to receive the print data sent from the computer terminal device 10 through the communication network 30.

The display operating section 24 is provided with a pressure sensitive operating section (touch panel) in which transparent electrodes are arranged in a lattice pattern, and which is mounted over the display section, such as an LCD (Liquid Crystal Display), an Organic EL (Electroluminescence) display device, etc., so as to make it possible not only to display various kinds of screens for operating the image forming apparatus 20 and for establishing the printing conditions, but also to input various kinds of setting items and instructions therefrom.

The image reading section 25 optically reads a document placed on a document placing plate (for instance, a platen cover) to output image data representing the document image, and for this purpose, is constituted by: a light source to emit a light beam to be scanned onto the document; an image sensor, such as a CCD (Charge Coupled Device) or the like, to convert light reflected from the document to electric signals; an analogue to digital converter to convert the electric signals to digital image data etc.

The image processing section 26 conducts consecutive operations of parsing the print data; rasterizing print data for each of the pages so as to generate image data for every page, or acquiring image data for every page from the image reading section 25; and applying image processing (various kinds of image processing, such as a color adjustment processing, a density adjustment processing, a size adjustment processing, etc.) and/or a screening processing to the image data. After that, the print processing section 27 converts the image data, outputted by the image processing section 26, to printable image data The print processing section 27 is constituted by such the structural elements that are necessary for the image forming operations to be conducted in the process of employing the electro-photographic method or the electrostatic recording method, so as to print the printing image based on the image data, generated by the image processing section 26, onto the paper sheet designated by the setting information.

In this connection, although the system, embodied in the present invention, is so constituted that the printer driver 11c provides the UI (User Interface) for displaying the print preview, it is also applicable that any other application program installed in an apparatus, other than the computer terminal device 10, provides the UI.

Further, it is also applicable that the control section 21 of the image forming apparatus 20 provides the UI. For instance, as shown in FIG. 3, it is applicable that the control section 21 of the image forming apparatus 20 is made to serve as the print function setting section, so that, when the print preview screen is displayed onto the display operating section, the slider controller is displayed so as to make it possible for the user to intuitively change the display magnification factor, and at the same time, the changed display magnification factor and/or a specific display magnification factor for the "fit page" mode or the like is also displayed while correlating it with the slider controller. On that occasion, when the printing operation is implemented on the basis of the image data read by the image reading section 25 of the image forming apparatus 20, it is also possible to omit the computer terminal device 10.

Further, it is also applicable that, in addition to the computer terminal device 10 and the image forming apparatus 20, a controlling apparatus, such as a RIP (Raster Image Processor) controller, etc., is coupled to the communication network 30, so as to make the controlling apparatus serve as the functions of the print function setting section.

Next, referring to the flowchart shown in FIG. 4, the operations to be conducted by the computer terminal device 10 coupled to the system, embodied in the present invention, will be detailed in the following. In this connection, although there will be described in the following such a case that the printer driver 11c of the computer terminal device 10 displays the print preview, the following descriptions can be also applied, as well, to such a case that the print preview is displayed onto the panel, before the image forming apparatus 20 implements the printing operation based on the print data <Creation of Print Data>

When the user operates the computer terminal device 10 to create a document by using the application program 11b that is executed on the OS 11a, and then, instructs the implementation of the printing operation according to the normal printing flow of the OS 11a, the printer driver 11c (print function setting section) makes the display section 14 display the print setting screen thereon. Successively, when the user has established the printing conditions from the print setting screen, the printer driver 11c (print data creating section) creates the print data for instructing the operation for printing the document in conformity with the printing conditions above-established (Step S101). In this connection, it is assumed in the present embodiment that the user instructs the operation for printing the document of one page having the letter size.

<Acquisition of Display Area Size>

At first, the printer driver 11c (print function setting section) acquires the size of the display area onto which the print preview of the document image is displayed (Step S102). In the present embodiment, it is assumed that the size of the display area is set at 400×400 dots, and the screen resolution of the display section 14 of the computer terminal device 10 is set at 72 dpi (dots per inch). In this connection, it is applicable that the size of the display area, abovementioned, is set at either a predetermined size determined in advance or an arbitral size established by the user.

<Acquisition of Paper Sheet Size>

Successively, the printer driver 11c (print function setting section) parses the print data created in Step S101, so as to acquire the paper sheet size specified by the print data concerned (Step S103). In the present embodiment, the paper sheet size is set at 8.5×11 inch of the "letter size".

<Creation of Initial Display Image>

Still successively, the printer driver 11c (print function setting section) creates an image to be displayed on the display area of the print preview at the initial displaying stage (Step S104). In the present embodiment, at the initial displaying stage, the print preview image is displayed by employing such a display magnification factor that make it possible to display (fit) the whole one page document onto all over the display area (hereinafter, referred to as a "WHOLE PAGE" display mode, or a "FIT PAGE" display mode). Further, any one of a magnification factor, which makes the width of the document image and the width of the display area coincide with each other (hereinafter, referred to as a "ADJUST WIDTH" display mode, or a "FIT WIDTH" display mode), and another magnification factor, which makes the height of the document image and the height of the display area coincide with each other (hereinafter, referred to as a "ADJUST HEIGHT" display mode, or a "FIT HEIGHT" display mode), may be employed as the magnification factor for the "WHOLE PAGE" display mode. Still further, still another magnification factor, which is calculated on the basis of the aspect ratio of the display area and the other aspect ratio of the paper sheet, may also be employed as the magnification factor for the "WHOLE PAGE" display mode. With respect to the former case, the method for calculating the display magnification factor will be detailed in the following.

At first, the resolution of the document image, which is to be employed for displaying the actual document image at the same magnification factor (hereinafter, referred to as "100%"), is adjusted to the screen resolution. In the present embodiment, since the screen resolution of the display section 14 is set at 72 dpi, the resolution of the document image is also set at 72 dpi. The abovementioned resolution of the document image may be either a constant value determined in advance or a value acquired from the OS 11a.

Successively, as shown in Table 1, the image size is derived from the resolution of the document image and the size of paper sheet to be employed. For instance, in the case of the "FIT HEIGHT" display mode, since the resolution in the height direction is set at 400 dots, the display magnification factors, which make the document image fit within the range of 400 dots, are incrementally found for every 1% interval. As a result, since, at 51%, the height is found as 403 dots, which exceeds the height of the display area, while, at 50%, the height is found as 396 dots, which fits within the height of the display area, the magnification factor is determined at 50%. As well as the abovementioned, in the case of the "FIT WIDTH" display mode, since the resolution in the width direction is set at 400 dots, the display magnification factors, which make the document image fit within the range of 400 dots, are incrementally found for every 1% increment. As a result, the magnification factor is determined at 65%. In this connection, in the present embodiment, the magnification factor that makes the size of the print preview image smallest (hereinafter, referred to as a "MINIMUM VALUE" or a "MINIMUM") is set at 1%, while the other magnification factor that makes the size of the print preview image greatest (hereinafter, referred to as a "MAXIMUM VALUE" or a "MAXIMUM") is set at 600%.

magnification factor of the "WHOLE PAGE" is set at 50%, the balloon of "WHOLE PAGE" is displayed in such a manner that the tip of arrow line extended therefrom is located at a position indicated as 50% on the slider controller.

<Image Display>

Successively, the printer driver 11c (print function setting section) displays the document image, created in Step S104, onto the display area of the print preview screen (Step S105). On that occasion, if another image has been displayed thereon, the printer driver 11c replaces the currently displayed image with the document image newly created. In this connection, since the processing for creating the document image consumes much time, it is applicable that the message notifying the user of the current status that the document image is in mid-course of the creating operation is displayed. For instance, it is preferable that a text message of "MID-COURSE OF CREATING IMAGE" or the like, or an animated image, such as a watch image, a progress bar, etc., indicating that the apparatus is "busy for processing" is displayed during the processing operation concerned, and after the operation for creating the initial display image has been completed, the text message or the animated image is replaced by the newly created image.

FIG. 5 shows a schematic diagram indicating an exemplary print preview screen to be displayed at the initial state when the "WHOLE PAGE" display mode is selected. From a print preview screen 40 shown in FIG. 5, it is possible to confirm the overall layout of the whole page, though it is impossible to view details of the image, an image formed by employing the magnification factor being same as that of the actually printed image, etc.

<Print Instruction>

Still successively, after displaying the print preview of the document image, the printer driver 11c (print function setting section) waits a print instruction to be inputted by the user (Step S106). Then, confirming the print preview of the document image, the user depresses the print button if the print preview is acceptable for the user, so as to issue the print instruction. Receiving the print instruction, the printer driver 11c shifts the processing to Step Sill, in order to implement the processing for transmitting the print data.

<Operation Monitoring>

TABLE 1

| Letter Size (inch) | % | Screen | Minimum Value 1 | Maximum Value 600 | 100% 100 | Whole Page 50 | Adjust Width 65 | Adjust Height 50 |
|---|---|---|---|---|---|---|---|---|
| 8.5 | X dots | 400 | 6.12 | 3672 | 612 | 306 | 397 | 306 |
| 11 | Y dots | 400 | 7.92 | 4752 | 792 | 396 | 514 | 396 |

As indicated in Table 1, in regard to the "WHOLE PAGE" display mode, the display magnification factor, the image size and the resolution are set at 50%, 306×396 dots and 72 dpi, respectively, and the print preview image of the document is created on the basis of the abovementioned information. In this connection, it is applicable that the image creation processing is conducted, based on either the size or the resolution.

Then, the line extended from each of the buttons indicated by "WHOLE PAGE", "FIT WIDTH", "FIT HEIGHT", "100%", "MINIMUM VALUE" and "MAXIMUM VALUE" (for instance, each of arrow lines extended from words balloons thereof) is connected to each of corresponding positions of the slider controller. For instance, since the display Receiving no print instruction inputted by the user in Step S106, the printer driver 11c (print function setting section) determines whether or not the slider controller of the magnification factor determining section or the button of the purpose command section is operated (Step S107). When determining that the slider controller is operated, the printer driver 11c conducts the processing for acquiring the magnification factor designated, while, when determining that the button is depressed, the printer driver 11c conducts the processing for determining the display magnification factor. For instance, when the user tries to view the print preview in the "ADJUST WIDTH" display mode, the user depresses the button labeled "ADJUST WIDTH", or adjusts the pointer of the slider controller at the tip of the blowout arrow extended from the button labeled "ADJUST WIDTH".

<Acquisition of Designated Magnification Factor>

The printer driver 11c (print function setting section) acquires the display magnification factor corresponding to the current position of the pointer of the slider controller (Step S108).

<Determination of Display Magnification Factor>

The printer driver 11c (print function setting section) determines the display magnification factor corresponding to the button depressed by the user (Step S109).

<Creation of Image to be Displayed>

Successively, the printer driver 11c (print function setting section) creates the print preview image of the document in conformity with the display magnification factor and the size determined in the above process (Step S110). After creating the print preview image, the printer driver 11c returns the processing to Step S105 so as to conduct the image display processing. On that occasion, the print preview image created in conformity with the display magnification factor of 50% has been enlarged so as to make it in conformity with the display magnification factor established in Step S108 or Step S109 (herein, 60%) and the enlarged image has been coarsely displayed on the screen, and after forming the image concerned, the printer driver 11c replaces the above-enlarged image with the new image created by the newly established display magnification factor so as to display the fine image, the width of which coincides with that of the screen. As described in the above, by displaying the print preview image being finer that ever, it becomes possible for the user to confirm the details of the image concerned. For instance, it becomes possible for the user to confirm that the concerned print product will be printed without overlapping the characters and the photographic image with each other.

Still successively, the printer driver 11c (print function setting section) repeats the processing from Step S105 to Step S110 so as to adjust the display magnification factor until the user instructs the printing operation in Step S106. On that occasion, according to the conventional printer driver, since only the revised display magnification factor is displayed, for instance, when the user intends to display the print preview again in the "WHOLE PAGE" display mode or the "ADJUST WIDTH" display mode after the print preview image of the document has been once enlarged to confirm the details thereof, it has been impossible to display the concerned image at the original display magnification factor. On the other hand, according to the printer driver embodied in the present invention, since the buttons respectively corresponding to the display modes, and the blowout arrows respectively extended from the buttons are displayed while correlating them with the magnification factors indicated on the slider controller, it becomes possible for the user not only to easily compare the current display magnification factor with those of the display modes, but also to easily resume any one of the display modes by selecting corresponding one of the display magnification factors, resulting in drastic improvement of the user's usability and convenience.

<Transmission of Print Data>

When the user instructs the printing operation (Step S106; Yes), the printer driver 11c finalizes the operation for displaying the print preview, and transmits the print data to image forming apparatus 20 (Step S111).

Successively, the image forming apparatus 20 receives the print data sent from the printer driver 11c through the communication interface section 23, and then, the image processing section 26 parses the print data so as to create image data in conformity with the bitmap format. After that, the print processing section 27 implements the printing operation based on the image data, and applies various kinds of post processing, such as a punch processing, a staple processing, etc., to the printed paper sheets, as needed.

As described in the foregoing, according to the present embodiment, since the printer driver 11c of the computer terminal device 10 (or the control section 21 of the image forming apparatus 20) displays the slider controller, which makes it possible for the user to intuitively operate the slider controller so as to adjust the display magnification factor of the document image, and the various kinds of buttons, which make it possible to establish the display magnification factor at the value corresponding to the user's desired purpose (display mode), within the print preview screen while correlating the display magnification factors represented by the buttons with the positions on the slider controller, it becomes possible for the user to confirm the layout of images in the concerned page, the details of the enlarged image, the same ratio image, etc., by conducting the intuitive operations before actually implementing the printing operation. Accordingly, it becomes possible to prevent the user from implementing the wasted printing operation, in advance, even if the user is inexperienced in operations for the printing system concerned.

Incidentally, the scope of the present invention is not limited to the embodiment described in the foregoing. Modifications and additions made by a skilled person without departing from the spirit and scope of the invention shall be included in the scope of the present invention.

For instance, although the slider controller, in which the pointer is movable in the one-dimensional direction, is employed for setting the display magnification factors at fine increments in the present embodiment, for instance, a kind of multi-dimensional chart, in which the pointer is made to move in the two-dimensional direction, or the like, may be also applicable for this purpose. Further, although the system is so constituted that the blowout arrows extended from the buttons are correlated with the positions on the slider controller in the present embodiment, it is also applicable that the hyperlink function or the like is employed for correlating them with each other.

Further, although the present invention is applied for such a case that the display magnification factor of the print preview image is made to change, in the present embodiment, the scope of the object for which the display magnification factor is made to change is not limited to the document image. The present invention can be applied for any kind of object in the same manner, as far as it is desired to intuitively change the display magnification factor of the object concerned.

The present invention is available for a print instruction program, such as a printer driver, etc., which is to be executed in an apparatus that instructs an image forming apparatus to implement a printing operation, an image forming apparatus that implements a printing operation according to a printing instruction, and a print preview displaying method for controlling a operation for displaying a print preview.

According to a print instruction program, an image forming apparatus and a print preview displaying method, embodied in the present invention, it becomes possible for the user to easily change the display magnification factor of the print preview image, in an intuitive manner, and it also becomes possible for the user to easily resumes the display magnification factor to the specific magnification factor to be employed for fitting one page of a document into the display area thereof.

This is because, when displaying the print preview image of the document, serving as the printing object, the image forming apparatus displays the print preview image, the slider that accepts the designation of the display magnification factor of the print preview image and the buttons that accept the designation of the display mode of the print preview image onto the display screen, and indicates the current magnification factor on the slider in a visible manner, and further displays the button corresponding to the fit page display mode in which the overall contents included in one page of the document is displayed onto the display screen, while correlating the button with a display magnification factor corresponding to the fit page display mode.

As described in the foregoing, by using the slider, it becomes possible for the beginning user to intuitively conduct the operation for changing the magnification factor and the fine adjustment operation thereof, and by displaying both the changed magnification factor and the display magnification factor of the fit page display mode on the slider while correlating them with each other, it also becomes possible for the concerned user to easily resume the fit page display mode. Further, by displaying the magnification factors corresponding to the user's purposes (various kinds of displaying modes), such as minimum value, maximum value, 100%, whole page, adjusting width, adjusting height, so on, on the slider while correlating them with each other, it becomes possible even for the beginning user to intuitively achieve the designation of the magnification factor corresponding to the user's purpose, and after selecting the button of "adjusting height" and after changing to the magnification factor corresponding to the user's purpose by moving the pointer of the slider in the direction of decreasing the magnification factor, etc., it is possible for the concerned user to conduct the fine adjustment of the magnification factor. As a result, it is possible for the concerned user to intuitively recognize the relationships between the currently displayed magnification factor and the magnification factors respectively corresponding to the user's purposes.

While the preferred embodiments of the present invention have been described using specific term, such description is for illustrative purpose only, and it is to be understood that changes and variations may be made without departing from the spirit and scope of the appended claims.

What is claimed is:

1. A non-transient computer readable storage medium storing a computer executable program, which is to be installed into either a computer device that instructs a printing operation or an image forming apparatus that implements the printing operation, so as to conduct an operation for displaying a print preview image of a document, serving as a printing object, onto a display screen, the program being executable by a computer to cause the computer to perform a process comprising:
  displaying, in the display screen, a slider controller for accepting a designation of a display magnification factor which is inputted by sliding a pointer movable on a slider indicating a plurality of display magnification factors allotted thereon, and which is to be employed for displaying the print preview image, wherein a position of the pointer indicates a current magnification factor;
  displaying, in the display screen, at least one button for accepting a designation of a display mode which is inputted by depressing one of the at least one button, and in which the print preview image is to be displayed, wherein the at least one button is displayed while correlating with a respective position on the slider corresponding to the display magnification factor of the display mode, wherein the at least one button includes a button of a display mode in which an overall content included in one page of a document is displayed onto the display screen;
  accepting the designation of a display magnification factor via the slider controller or the designation of a display mode via the at least one button;
  creating the print preview image, based on either the display magnification factor designated via the slider controller, or a display magnification factor which is calculated based on the display mode via the at least one button; and
  displaying, in the display screen, the print preview image created in the creating step;
  wherein the slider and the at least one button are displayed onto the display screen, in such a manner that either lines or arrow symbols are employed for connecting the at least one button to positions on the slider corresponding to the display magnification factors of the display modes, so as to correlate the at least one button with a position on the slider corresponding to the display magnification factor of the display mode.

2. The non-transient computer readable storage medium of claim 1, wherein the at least one button further includes at least one of: a button of a display mode in which the print preview image is displayed by employing a minimum magnification factor being settable by the slider; a button of another display mode in which the print preview image is displayed by employing a maximum magnification factor being settable by the slider; a button of still another display mode in which the print preview image is displayed by employing such a magnification factor that makes a size of the print preview image coincide with that of the document to be printed; a button of still another display mode in which the print preview image is displayed by employing such a magnification factor that makes a height of the print preview image coincide with that of the display screen; and a button of yet another display mode in which the print preview image is displayed by employing such a magnification factor that makes a width of the print preview image coincide with that of the display screen.

3. The non-transient computer readable storage medium of claim 1, wherein the at least one button is displayed side by side with the slider.

4. The non-transient computer readable storage medium of claim 1, wherein the at least one button comprises a letter indicating the display mode.

5. The non-transient computer readable storage medium of claim 1, wherein the computer executable program is a printer driver.

6. An image forming apparatus, comprising:
  a print function setting section to display a print preview image of a document, serving as a printing object, onto a display screen; and
  a print processing section to print an image in conformity with the print preview image onto a paper sheet;
  wherein the print function setting section is provided with:
    a first designating section to accept a designation of a display magnification factor which is inputted by sliding a pointer movable on a slider indicating a plurality of display magnification factors allotted thereon, and which is to be employed for displaying the print preview image, wherein a position of the pointer indicates a current magnification factor;
    a second designating section to accept a designation of a display mode which is inputted by depressing one of the at least one button, and in which the print preview image is to be displayed, wherein the at least one button is displayed while correlating with a respective position on the slider corresponding to the display magnification factor of the display mode, wherein the at least one button includes a button of a display mode in which an overall content included in one page of a document is displayed onto the display screen;

an image creating section to create the print preview image, based on either the display magnification factor designated by the first designating section, or a display magnification factor which is calculated based on the display mode designated by the second designating section;

a display controlling section to create the print preview image;

wherein the display controlling section creates the print preview image, in such a manner that either lines or arrow symbols are employed for connecting the at least one button to positions on the slider corresponding to the display magnification factors of the display modes, so as to correlate the at least one button with a position on the slider corresponding to the display magnification factor of the display mode.

7. The image forming apparatus of claim 6, wherein the at least one button further includes at least one of: a button of a display mode in which the print preview image is displayed by employing a minimum magnification factor being settable by the slider; a button of another display mode in which the print preview image is displayed by employing a maximum magnification factor being settable by the slider; a button of still another display mode in which the print preview image is displayed by employing such a magnification factor that makes a size of the print preview image coincide with that of the document to be printed; a button of still another display mode in which the print preview image is displayed by employing such a magnification factor that makes a height of the print preview image coincide with that of the display screen; and a button of yet another display mode in which the print preview image is displayed by employing such a magnification factor that makes a width of the print preview image coincide with that of the display screen.

8. The image forming apparatus of claim 6, wherein the at least one button is displayed side by side with the slider.

9. The image forming apparatus of claim 6, wherein the at least one button comprises a letter indicating the display mode.

10. A print preview displaying method, which is to be employed in either a computer device that instructs a printing operation or an image forming apparatus that implements the printing operation, for displaying a print preview image of a document, serving as a printing object, onto a display screen, the print preview displaying method comprising:

displaying the print preview image, a slider that accepts a designation of a display magnification factor for the print preview image, and at least one button that accepts a designation of a display mode for the print preview image, onto the display screen, wherein the display magnification factor is inputted by sliding a pointer movable on the slider indicating a plurality of display magnification factors allotted thereon, wherein a position of the pointer indicates a current magnification factor, wherein the at least one button is displayed while correlating with a respective position on the slider corresponding to the display magnification factor of the display mode, wherein the at least one button includes a button of a display mode in which an overall content included in one page of a document is displayed onto the display screen;

wherein the slider and the at least one button are displayed onto the display screen, in such a manner that either lines or arrow symbols are employed for connecting the at least one button to positions on the slider corresponding to the display magnification factors of the display modes, so as to correlate the at least one button with a position on the slider corresponding to the display magnification factor of the display mode.

11. The print preview displaying method of claim 10:

wherein the at least one button further includes at least one of: a button of a display mode in which the print preview image is displayed by employing a minimum magnification factor being settable by the slider; a button of another display mode in which the print preview image is displayed by employing a maximum magnification factor being settable by the slider; a button of still another display mode in which the print preview image is displayed by employing such a magnification factor that makes a size of the print preview image coincide with that of the document to be printed; a button of still another display mode in which the print preview image is displayed by employing such a magnification factor that makes a height of the print preview image coincide with that of the display screen; and a button of yet another display mode in which the print preview image is displayed by employing such a magnification factor that makes a width of the print preview image coincide with that of the display screen.

12. The print preview displaying method of claim 10, wherein the at least one button is displayed side by side with the slider.

13. The print preview displaying method of claim 10, wherein the at least one button comprises a letter indicating the display mode.

* * * * *